United States Patent
Nishimura et al.

(10) Patent No.: US 9,761,846 B2
(45) Date of Patent: Sep. 12, 2017

(54) BATTERY CASE

(71) Applicant: FUTABA INDUSTRIAL CO., LTD., Aichi (JP)

(72) Inventors: Ryuzo Nishimura, Aichi (JP); Shinichiro Nakane, Aichi (JP); Yasumasa Seto, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 56 days.

(21) Appl. No.: 14/760,653

(22) PCT Filed: Dec. 26, 2013

(86) PCT No.: PCT/JP2013/084863
§ 371 (c)(1),
(2) Date: Jul. 13, 2015

(87) PCT Pub. No.: WO2014/109243
PCT Pub. Date: Jul. 17, 2014

(65) Prior Publication Data
US 2015/0357606 A1    Dec. 10, 2015

(30) Foreign Application Priority Data

Jan. 11, 2013  (JP) .................................. 2013-003725

(51) Int. Cl.
*H01M 2/02* (2006.01)
*H01M 2/10* (2006.01)
*B60L 11/18* (2006.01)

(52) U.S. Cl.
CPC ......... *H01M 2/024* (2013.01); *B60L 11/1877* (2013.01); *B60L 11/1879* (2013.01);
(Continued)

(58) Field of Classification Search
CPC ........ A01H 5/10; A01H 1/02; C12N 15/8274; C12N 15/8289; C12N 15/8286;
(Continued)

(56) References Cited

U.S. PATENT DOCUMENTS 4,418,127 A * 11/1983 Shambaugh ........ H01M 2/0202
429/149
2012/0103714 A1    5/2012 Choi et al.
(Continued)

FOREIGN PATENT DOCUMENTS

CN  102468454 A  5/2012
DE  4344713  *  3/1995  ............. F16L 59/06
(Continued)

OTHER PUBLICATIONS

International Search Report dated Mar. 14, 2014 for corresponding International Application No. PCT/JP2013/084863, filed Dec. 26, 2013.
(Continued)

*Primary Examiner* — Patrick Ryan
*Assistant Examiner* — Aaron Greso
(74) *Attorney, Agent, or Firm* — David D. Brush; Westman, Champlin & Koehler, P.A.

(57) ABSTRACT

A battery case comprises: a first casing member; a second casing member to form a closed space together with the first casing member; a foam material provided along an inner wall surface of the closed space; and a reinforcing member provided in the closed space so as to hold the foam material between the reinforcing member and the inner wall surface.

5 Claims, 7 Drawing Sheets

(52) U.S. Cl.
CPC ....... *H01M 2/0287* (2013.01); *H01M 2/1072* (2013.01); *H01M 2220/20* (2013.01); *Y02T 10/7005* (2013.01); *Y02T 10/705* (2013.01)

(58) Field of Classification Search
CPC ............ C12N 15/8279; C12N 15/8241; C12N 15/8245; C12N 15/8247; C12N 15/8251; C12N 15/8243; H01M 10/6556; H01M 10/625; H01M 10/615; H01M 10/613; H01M 10/6563; H01M 2/10; H01M 2/024; H01M 2220/20; H01M 2/0287; B60K 1/04; B60L 11/1877; B60L 11/1879; Y02T 10/705
See application file for complete search history.

(56) References Cited

U.S. PATENT DOCUMENTS

| | | |
|---|---|---|
| 2012/0115000 A1 | 5/2012 | Hashimura et al. |
| 2014/0065007 A1 | 3/2014 | Naitou et al. |
| 2014/0193694 A1 | 7/2014 | Hoshi et al. |

FOREIGN PATENT DOCUMENTS

| | | |
|---|---|---|
| JP | 06001150 A | 1/1994 |
| JP | 2011023230 A | 2/2011 |
| JP | 201294476 A | 5/2012 |
| JP | 2012089377 A | 5/2012 |
| WO | 2012140728 A1 | 10/2012 |
| WO | 2012169640 A1 | 12/2012 |

OTHER PUBLICATIONS

PCT/IB/338 dated Jul. 16, 2015 for corresponding International Patent Application No. PCT/JP2013/084863, filed Dec. 26, 2013.
Partial translation of PCT/ISA/237 dated Jul. 11, 2015 for corresponding International Patent Application No. PCT/JP2013/084863, filed Dec. 26, 2013.
English translation of International Preliminary Report on Patentability dated Jul. 11, 2015 for corresponding International Patent Application No. PCT/JP2013/084863, filed Dec. 26, 2013.
English translation of Office Action from the State Intellectual Property Office of China, dated Sep. 5, 2016, for Chinese Application No. 201380070174.9.
Canadian Office Action dated Dec. 20, 2016, for Canadian Application No. 2,897,918.

\* cited by examiner

SIZE REDUCTION EFFECT IN INTRODUCED EXAMPLE
(ONLY REGARDING WIDTH OF REINFORCING MEMBER)

|  | CONVENTIONAL | NOVEL | EFFECT |
|---|---|---|---|
| WIDTH | 40 | 30 | SIZE REDUCTION OF 10 mm |

FIG. 5A

SIZE REDUCTION EFFECT (APPROXIMATION BASED ON OUTERMOST SHAPE: L1000×W900, ATTACHMENT FLANGES: 40)

|  | CONVENTIONAL | NOVEL | EFFECT |
|---|---|---|---|
| BATTERY MOUNTING SPACE | 740 | 760 | IMPROVEMENT OF 20 mm |

FIG. 5B

COMPARISON OF FULL PLASTIC MOMENT IN INTRODUCED EXAMPLE

|  | CONVENTIONAL MODEL | PRESENT INVENTION MODEL | |
|---|---|---|---|
|  |  | WITHOUT RESIN FILLING | WITH RESIN FILLING |
| FULL PLASTIC MOMENT [kN·m] | 5.4 | 3.8 | 145% → (5.5) |

FIG. 5C

WEIGHT REDUCTION EFFECT (APPROXIMATION BASED ON L1000×W900)

|  | CONVENTIONAL | NOVEL | EFFECT | |
|---|---|---|---|---|
| MASS | 43.8 kg | 24.3 kg | -19.5 kg | IMPROVEMENT OF 45% |

FIG. 5D

BATTERY CASE

CROSS-REFERENCE TO RELATED APPLICATIONS

This application is a Section 371 National Stage Application of International Application No. PCT/JP2013/084863, filed Dec. 26, 2013, published as WO 2014/109243 A1 on Jul. 17, 2014, not in English, which is based on and claims the benefit of Japanese Patent Application No. 2013-003725, filed Jan. 11, 2013 in the Japan Patent Office, the contents of which are incorporated herein by reference in their entireties.

TECHNICAL FIELD

The present invention relates to a battery case.

BACKGROUND ART

An electric vehicle (EV), a plug-in hybrid vehicle (PHV), or the like includes, under its floor, a battery case to house a battery (see Patent Document 1).

PRIOR ART DOCUMENTS

Patent Documents

Patent Document 1: Japanese Unexamined Patent Application Publication No. 2011-23230

SUMMARY OF THE INVENTION

Problems to be Solved by the Invention

The above-mentioned battery case involves a problem that its reinforcement structure against external impact tends to lead to weight increase.

In one aspect of the present invention, it is desirable to enhance weight reduction of a battery case.

Means for Solving the Problems

A battery case in one aspect of the present invention comprises a first casing member, a second casing member to form a closed space together with the first casing member, a foam material provided along an inner wall surface of the closed space, and a reinforcing member provided in the closed space so as to hold the foam material between the reinforcing member and the inner wall surface. According to such configuration, use of the foam material enables simplification of the reinforcing member, leading to achievement of weight reduction.

In the above configuration, the reinforcing member may be formed by hot stamping.

BRIEF DESCRIPTION OF THE DRAWINGS

FIG. 5A is a diagram showing numerical examples of widths of reinforcing members.

FIG. 5B is a diagram showing numerical examples of battery mounting spaces.

FIG. 5C is a diagram showing numerical examples of full plastic moments.

FIG. 5D is a diagram showing numerical examples of masses.

EXPLANATION OF REFERENCE NUMERALS

1 . . . battery case, 2 . . . lower case, 3 . . . upper case, 4 . . . reinforcing member, 5 . . . resin foam material, 6 . . . sealing material, 7 . . . resin foam material, 9 . . . automobile, 21 . . . flange, 31 . . . flange, 41 . . . first plate portion, 42 . . . second plate portion, 43 . . . third plate portion, 44 . . . fourth plate portion

MODE FOR CARRYING OUT THE INVENTION

Hereinafter, a description will be given of an embodiment, to which the present invention is applied, with reference to the drawings.

Figure 1:
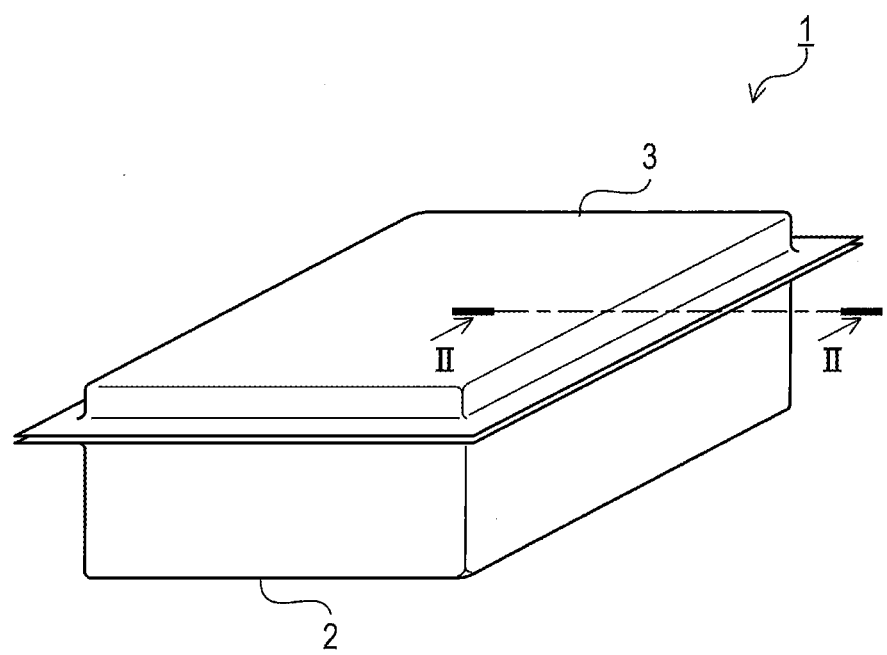
FIG. 1 is a perspective view of a battery case.
Figure 2:
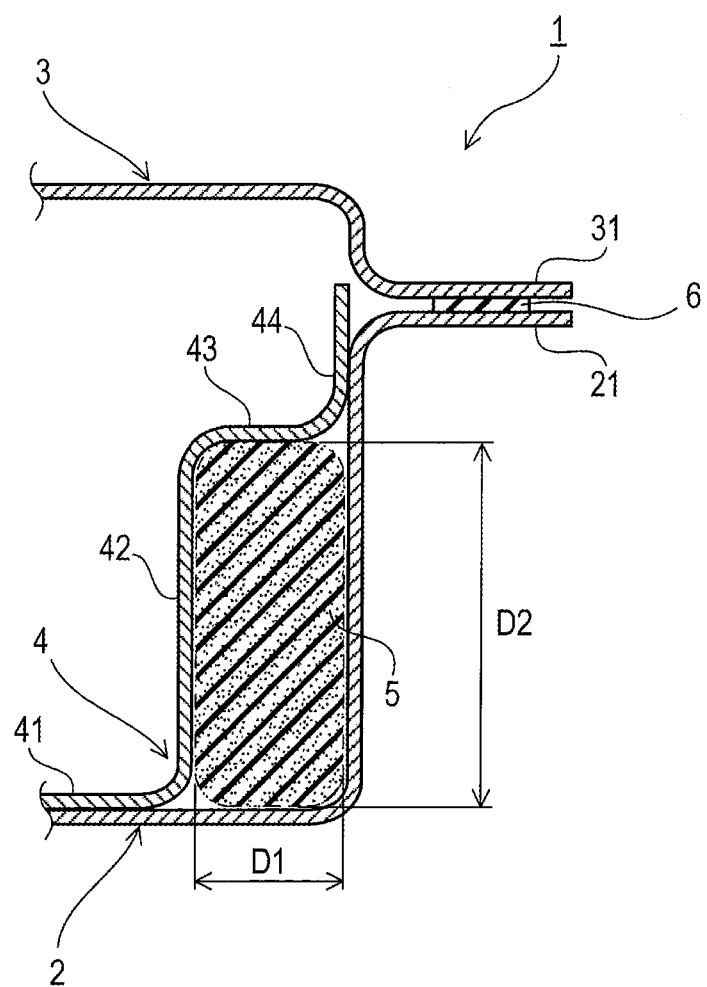
FIG. 2 is a sectional view taken along a line II-II of FIG. 1.
Figure 3:
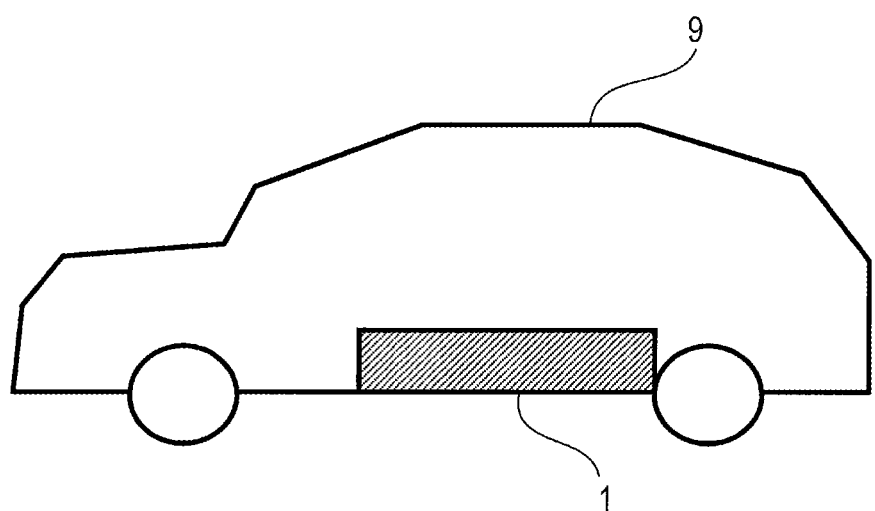
FIG. 3 is a view showing an example of a mounting position of a battery case in an automobile.

FIG. 1 is a perspective view of a battery case 1 of the embodiment, FIG. 2 is a sectional view taken along a line II-II of FIG. 1. As shown in FIG. 3, for example, the battery case 1 is disposed under the floor of an automobile 9, such as an electric vehicle (EV) and a plug-in hybrid vehicle (PHV). The battery case 1 comprises a lower case 2, an upper case 3, a reinforcing member 4, and a resin foam material 5.

Each of the lower case 2 and the upper case 3 is a member obtained by processing a metal material (a 270 material having a sheet thickness of 0.7 mm in this example), the member is formed in a container shape having a recessed portion in the center thereof and a generally rectangular bottom surface of the recessed portion. The lower case 2 and the upper case 3 are arranged such that their respective recessed sides face each other, to thereby form therein a generally rectangular parallelepiped housing space (a closed space) to house and seal a battery. The lower case 2 is shaped to have a depth larger than a depth of the upper case 3, and the upper case 3 serves as a lid of the lower case 2. The value "270" of the 270 material represents a tensile strength (a lower limit) of a material. The same is applicable to a later mentioned 590 material.

A flange 21 is formed at an outer periphery of the lower case 2. In a similar manner, a flange 31 is formed at an outer periphery of the upper case 3. The flanges 21 and 31 have corresponding shapes; the lower case 2 and the upper case 3 are assembled such that their respective flanges 21 and 31 overlap each other. A sealing material 6 is provided between the flanges 21 and 31. The flanges 21 and 31 serve as a vehicle attachment portion to attach the battery case 1 to the automobile.

The reinforcing member 4 is formed by hot stamping of a metal material (an iron sheet having a thickness of 2.0 mm in this example). Hot stamping is a processing method of a combination of press molding and heat treatment (quenching and tempering) performed using a steel sheet. Through hot stamping, in which a steel sheet is first heated and then quickly cooled concurrently with molding using a die to form a desired shape, it is possible to quench the molded steel sheet to achieve improved strength.

The reinforcing member 4 is formed in a rectangular annular shape (a frame-like shape) so as to be located along an inner side surface of the lower case 2. Specifically, the reinforcing member 4 comprises a first plate portion 41, a second plate portion 42, a third plate portion 43, and a fourth plate portion 44. The first plate portion 41 is welded to a bottom surface of the lower case 2. The second plate portion 42 faces the inner side surface of the lower case 2 with a specified distance D1 (for example, 30 mm) therebetween. The third plate portion 43 faces the bottom surface of the lower case 2 with a specified distance D2 therebetween. The fourth plate portion 44 is welded to the inner side surface of the lower case 2.

The resin foam material 5, which is a high-rigidity foam filler to be filled in a closed space to thereby provide rigid foam, is filled in a space formed between the lower case 2 and the reinforcing member 4. That is, the resin foam material 5 is formed in a rectangular annular shape (a frame-like shape) so as to be located along an inner wall surface (the bottom surface and the inner side surface) of the lower case 2.

According to the embodiment detailed as above, the following effects can be obtained.

The battery case 1 comprises the lower case 2, the upper case 3 to form a closed space together with the lower case 2, the resin foam material 5 provided along the inner wall surface (the inner wall surface of the lower case 2), the reinforcing member 4 provided in the closed space so as to hold the resin foam material 5 between the reinforcing member 4 and the inner wall surface of the lower case 2. According to the present embodiment, since a reinforcing structure using the resin foam material 5 can simplify the reinforcing member 4, it is possible to achieve reduction in the number of components and size reduction of components, and thus to achieve weight reduction.

A description will be given of effects of the present embodiment in comparison with a conventional structure. A battery case 8 shown in FIG. 4 as a conventional example includes an upper case 81 and a lower case 82 made of the same material (a 270 material having a sheet thickness of 0.7 mm) as the material in the above-described embodiment, a plurality of reinforcing members 83, 84, and 85 made of a material (a 590 material having a sheet thickness of 2.0 mm) with higher strength than the material for these cases, and a reinforcing member 86 made of a material (a 590 material having a sheet thickness of 2.3 mm) with further higher strength. The reinforcing members 83, 84, 85, and 86 are provided outside a housing space that is formed by the upper case 81 and the lower case 82, and sealed with a plurality of sealing materials 87 (provided at four positions in this example). According to a structure to ensure strength only by reinforcing members of sheet metal, as described above, it is required to increase the sheet thicknesses of the reinforcing members and/or to increase the number of components, and thus the numbers of welding areas and sealing areas are more likely to be increased. Increase in the numbers of welding areas and sealing areas will lead to weight increase and/or deterioration in waterproof performance.

In contrast, according to the structure of the present embodiment, in which the reinforcing member 4 with high strength that is formed by hot stamping is provided in the housing space, it is possible to reduce the number of components to thereby reduce the number of sealing areas (for example, to only one area). Also, consideration on a filling shape of the resin foam material will lead to improved shape retainability of a sectional shape, which will further lead to improved load sharing ability of each of the components. As a result, size reduction and weight reduction may be achieved, and improved waterproof performance may be achieved. For example, a width D3 of the reinforcing member needs to be 40 mm or more according to the conventional structure shown in FIG. 4, in order to obtain a specified reinforcing effect in the battery case. On the other hand, according to the structure of the present embodiment shown in FIG. 2, a width D1 of the reinforcing member may be reduced to 30 mm (FIG. 5A). In a case where an outermost shape of the battery case is L1000 mm×<W900 mm, and the width of the flange 83 and the width of flange 31 are both 40 mm, a width dimension that can be used to mount a battery is 740 mm according to the conventional structure shown in FIG. 4, whereas the width dimension may be 760 mm according to the structure of the present embodiment shown in FIG. 2 (FIG. 5B). That is, the structure of the present embodiment allows a larger housing space of the battery case than the conventional structure.

Figure 6:
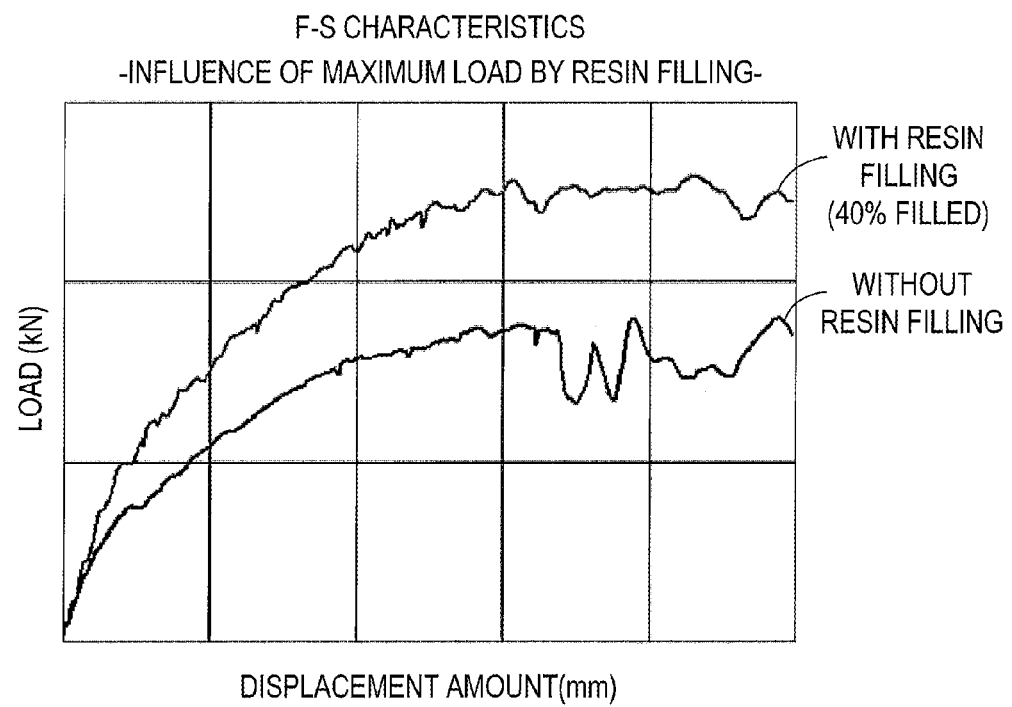
FIG. 6 is a graph showing a relationship between a displacement amount and a load.

The lower case 2, which is made of thin sheet metal, is weak against load; however, in the present embodiment, the resin foam material 5 is filled between the lower case 2 and the reinforcing member 4 to thereby increase the sectional strength by almost 50%, while controlling the filling amount to 40% by considering the filling shape (FIG. 6). In this case, the full plastic moment was confirmed to be 3.8 [kN·m] in a state without filling; the full plastic moment will be 5.5 [kN·m] on an assumption of an improvement of 145% as compared with the state without filling of resin (the state where the resin foam material 5 is not filled), and thus it is expected that a strength almost equal to that of the conventional configuration can be obtained (FIG. 5C).

Figure 4:
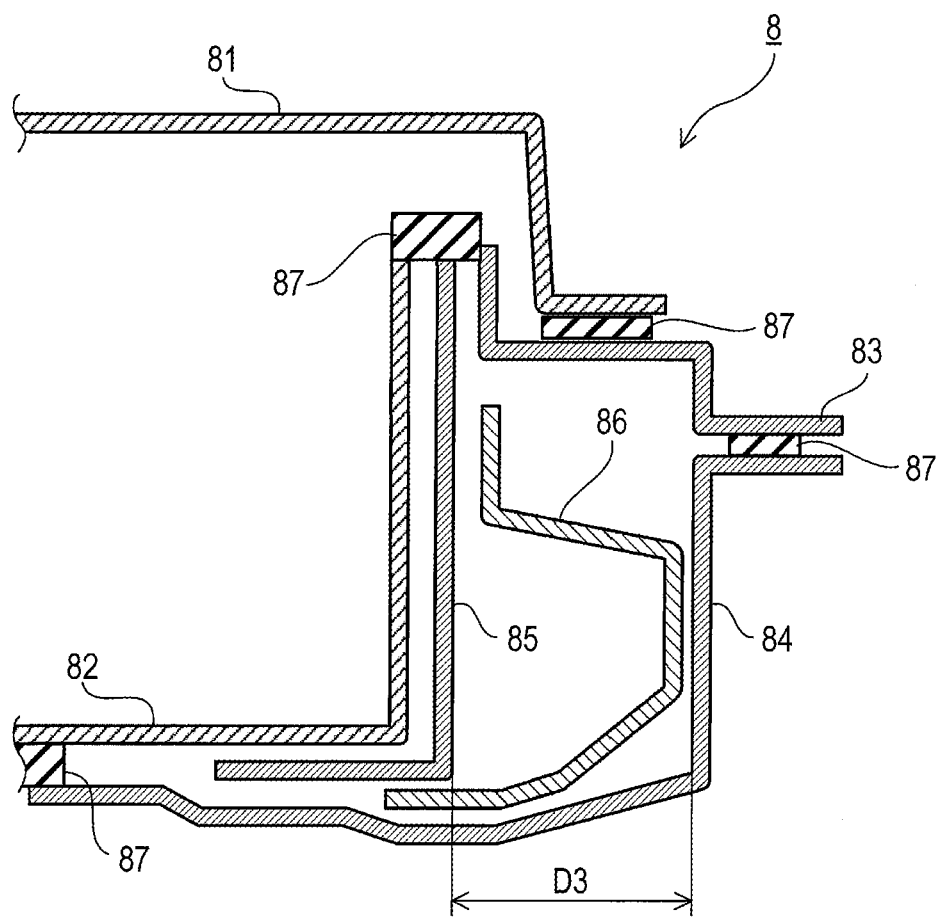
FIG. 4 is a partial sectional view of a conventional battery case.

In particular, according to the present embodiment, substantial weight reduction can be achieved. For example, if it is configured such that an outermost shape is L1000 mm×W900 mm and a specified reinforcing effect is achieved in a battery case, the weight of the structure of the present embodiment can be reduced to 24.3 kg, whereas the weight of the conventional structure shown in FIG. 4 is 43.8 kg (FIG. 5D).

The lower case 2 corresponds to an example of a first casing member, the upper case 3 corresponds to an example of a second casing member, and the resin foam material 5 corresponds to an example of a foam material.

Although the embodiment of the present invention has been described as above, it is to be understood that the present invention should not be limited to the above-described embodiment, but may be practiced in various forms.

Figure 7:
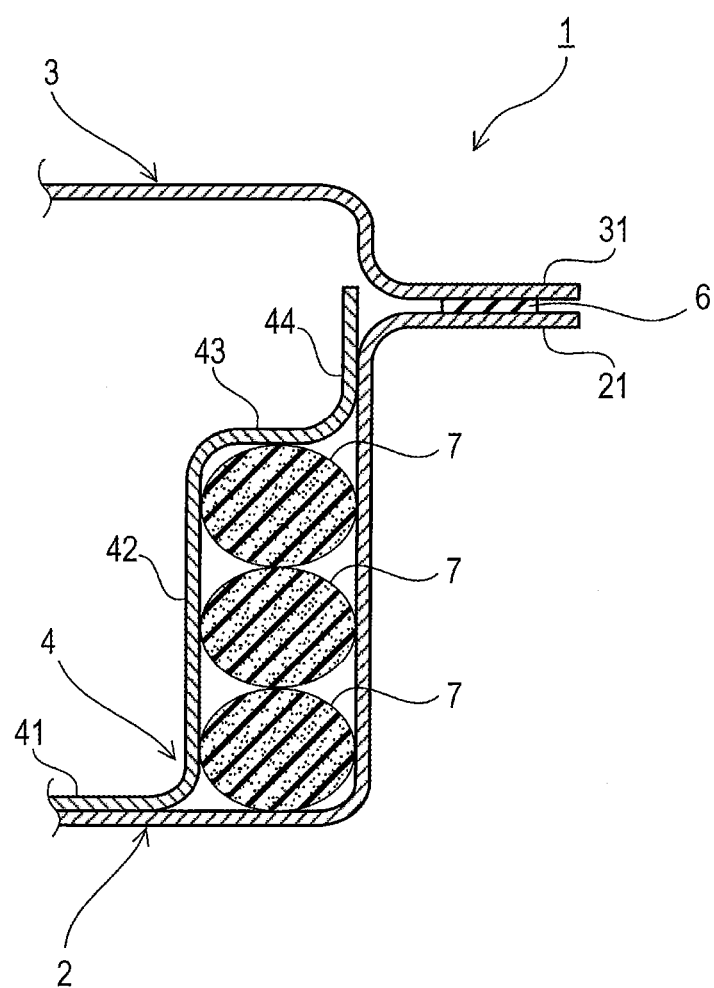
FIG. 7 is a sectional view of a modified example of the battery case.

For example, although the resin foam material 5 is exemplified as the foam material in the above-described embodiment, other foam materials may be employed. Also, the shape, the number, or the like, of the foam materials is not particularly limited. Specifically, the foam material may be provided so as to fill the entirety of a fillable space (a space that is formed between the inner wall surface and the reinforcing member in the closed space formed by the first casing member and the second casing member), in which the foam material can be filled. Here, the expression "fill the entirety of a fillable space" is not limited to a strict meaning of leaving no gap, but means a state (for example, a state shown in FIG. 2) where the shape of the fillable space and the shape of the foam material correspond to each other, and a space without the foam material is not intentionally formed. On the other hand, the foam material may be provided so as to fill only part of the fillable space (in other words, such that a space without the foam material is formed) as shown in FIG. 7, for example, or may be provided in plurality. In the example shown in FIG. 7, a plurality of (three in this example) resin foam materials 7, each having a circular section (i.e., each having a columnar shape in this example), are housed. Various shapes, such as a shape having a triangular section, a shape having a rectangular section, a shape having a trapezoidal section, etc., may be employed as the shape of the foam material.

Also, although the configuration including the reinforcing member 4 formed by hot stamping is exemplified in the above-described embodiment, this is not a limitation. For example, a configuration without a component formed by hot stamping may be employed, whereas a configuration in which a component formed by hot stamping is used also for the casing member may be employed.

Further, the present invention may be applied to other purposes than battery cases.

The invention claimed is:

1. A battery case comprising:
    a first casing member having a container shape with a recessed portion in a center thereof;
    a second casing member having a container shape with a recessed portion in a center thereof, the first and second casing members being arranged such that the respective recessed portions face one another to form a first, parallelepiped closed space to house a battery, wherein the first closed space is formed only by the first casing member and the second casing member;
    a reinforcing member provided in the first closed space and attached to the second casing member, the reinforcing member having a plate portion that is spaced from an inner wall surface of the second casing member to form a second closed space between the reinforcing member and the second casing member; and
    a foam material provided in the second closed space, between the reinforcing member and the inner wall surface of the second casing member, wherein the reinforcing member holds the foam material between the reinforcing member and the inner wall surface.

2. The battery case according to claim 1, wherein the reinforcing member is formed by hot stamping.

3. The battery case according to claim 2, wherein each of the first casing member and the second casing member is a metal member that is not formed by hot stamping.

4. The battery case according to claim 1, wherein the reinforcing member comprises:
    a first plate portion that is welded to a bottom surface of the second casing member;
    a second plate portion that faces an inner side surface of the second casing member with a distance therebetween;
    a third plate portion that faces the bottom surface of the second casing member with a distance therebetween; and
    a fourth plate portion that is welded to the inner side surface of the second casing member.

5. The battery case according to claim 1, wherein the foam material is held only by the inner wall surface of the second casing member and the reinforcing member.

\* \* \* \* \*